(12) United States Patent
Sano et al.

(10) Patent No.: US 9,340,672 B2
(45) Date of Patent: May 17, 2016

(54) RESIN COMPOSITION, COMPOSITE CURED PRODUCT USING SAME, AND METHOD FOR PRODUCING THE COMPOSITE CURED PRODUCT

(75) Inventors: Kentaro Sano, Iyo-gun (JP); Yuki Mitsutsuji, Nagoya (JP); Masato Honma, Otsu (JP)

(73) Assignee: Toray Industries, Inc. (JP)

( * ) Notice: Subject to any disclaimer, the term of this patent is extended or adjusted under 35 U.S.C. 154(b) by 205 days.

(21) Appl. No.: 13/993,185

(22) PCT Filed: Dec. 7, 2011

(86) PCT No.: PCT/JP2011/078247
§ 371 (c)(1),
(2), (4) Date: Jun. 11, 2013

(87) PCT Pub. No.: WO2012/081455
PCT Pub. Date: Jun. 21, 2012

(65) Prior Publication Data
US 2013/0261229 A1    Oct. 3, 2013

(30) Foreign Application Priority Data

Dec. 13, 2010 (JP) .................. 2010-276775

(51) Int. Cl.
| | | |
|---|---|---|
| C08L 81/04 | (2006.01) | |
| C08L 63/00 | (2006.01) | |
| C08L 87/00 | (2006.01) | |
| C08G 75/14 | (2006.01) | |
| C08K 3/04 | (2006.01) | |
| C08K 7/06 | (2006.01) | |
| C08K 7/14 | (2006.01) | |
| C08L 79/08 | (2006.01) | |
| C08L 71/00 | (2006.01) | |

(52) U.S. Cl.
CPC .............. *C08L 79/08* (2013.01); *C08L 63/00* (2013.01); *C08L 71/00* (2013.01); *C08L 81/04* (2013.01); *C08L 87/00* (2013.01); *C08K 3/04* (2013.01); *C08K 7/06* (2013.01); *C08K 7/14* (2013.01)

(58) Field of Classification Search
CPC ......... C08L 79/08; C08L 81/04; C08L 71/00; C08L 63/00; C08K 7/06; C08K 7/14; C08K 3/04
USPC .............. 523/435; 427/385.5; 525/396, 418; 524/538
See application file for complete search history.

(56) References Cited

U.S. PATENT DOCUMENTS

| | | | |
|---|---|---|---|
| 5,264,538 A | 11/1993 | Mullins et al. | |
| 5,384,391 A | 1/1995 | Miyata et al. | |
| 7,824,770 B2 * | 11/2010 | Honma et al. | ........... 428/373 |
| 2006/0149088 A1 * | 7/2006 | Hiraike | ........... C07F 15/0046 |
| | | | 556/19 |
| 2010/0068518 A1 | 3/2010 | Honma et al. | |

FOREIGN PATENT DOCUMENTS

| | | |
|---|---|---|
| JP | 03-088828 | 4/1991 |
| JP | 5-39371 | 2/1993 |
| JP | 05-163349 | 6/1993 |
| JP | 9-25346 | 1/1997 |
| JP | 2000-355629 | 12/2000 |
| JP | 2003-080519 | 3/2003 |
| JP | 2007-506833 | 3/2007 |
| JP | 2008-222889 | 9/2008 |
| JP | 2008222889 A * | 9/2008 |
| JP | 2008-231237 | 10/2008 |
| JP | 2009007521 A * | 1/2009 |
| JP | 2010-121108 | 6/2010 |
| WO | 2006/077153 | 7/2006 |
| WO | WO 2008114573 A1 * | 9/2008 |

OTHER PUBLICATIONS

Strandman et al., "Recent advances in entropy-driven ring-opening polymerizations," Polymer Chemistry, Feb. 2011, pp. 791-799, published Dec. 1, 2010.*

* cited by examiner

*Primary Examiner* — Randy Gulakowski
*Assistant Examiner* — Ha Nguyen
(74) *Attorney, Agent, or Firm* — DLA Piper LLP (US)

(57) ABSTRACT

A resin composition including 10 to 90% by mass of (A) a component to be polymerized containing a compound represented by Formula (1), and 90 to 10% by mass of (B) a thermosetting resin, the (A) and (B) each being capable of undergoing a reaction to increase molecular weight by itself when heated:

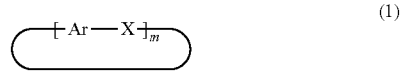

(1)

wherein, Ar represents an aryl; and X represents at least one selected from the group consisting of ethers, ketones, sulfides, sulfones, amides, carbonates and esters.

14 Claims, No Drawings

RESIN COMPOSITION, COMPOSITE CURED PRODUCT USING SAME, AND METHOD FOR PRODUCING THE COMPOSITE CURED PRODUCT

TECHNICAL FIELD

This disclosure relates to a resin composition, a composite cured product using the same and a method of producing the composite cured product. More particularly, the disclosure relates to a resin composition which has excellent moldability and impregnation properties and yields a composite cured product which can be demolded at a curing temperature; a composite cured product comprising the resin composition; and a method of producing the composite cured product.

BACKGROUND

Fiber-reinforced composite materials composed of a reinforcement fiber and a matrix resin have light weight and exhibit excellent dynamic properties. Therefore, they are widely used in sporting-goods applications, aerospace applications and general industrial applications. The reinforcement fibers that are used in these fiber-reinforced composite materials assume a variety of forms in accordance with the use and reinforce molded articles. As such reinforcement fibers, for example, metal fibers such as aluminum fibers and stainless steel fibers, organic fibers such as aramid fibers and PBO fibers, inorganic fibers such as silicon carbide fibers, and carbon fibers are employed. From the standpoint of the balance in the specific strength, specific rigidity and light-weightness, carbon fibers are preferred and thereamong, polyacrylonitrile-based carbon fibers are suitably employed.

Further, as a matrix resin used in these fiber-reinforced composite materials, for example, thermosetting resins and thermoplastic resins are employed, and these resins are each produced by a different method.

As a method of producing a fiber-reinforced composite material in which a thermosetting resin is used as a matrix resin, for example, a method in which a plurality of prepregs, each of which is a sheet-form intermediate material in which a reinforcement fiber is impregnated with an uncured thermosetting resin, are laminated and then heat-cured, a resin transfer molding method in which a liquid thermosetting resin is poured into a reinforcement fiber provided in a mold and then heat-cured, a filament winding method in which a reinforcement fiber, which is immersed in and impregnated with a liquid thermosetting resin, is wound around a mandrel or the like and then heat-cured, or a pultrusion method in which a reinforcement fiber is immersed in and impregnated with a liquid thermosetting resin and then passed through a heated mold, thereby heat-curing the thermosetting resin, is employed.

In general, as compared to thermoplastic resins, thermosetting resins have a higher elastic modulus. However, they are inferior in terms of toughness and durability. Among thermosetting resins, epoxy resins have been preferably used from the standpoint of adhesion with a reinforcement fiber and, as a method of improving the toughness and durability of an epoxy resin, there have been tried methods of blending a thermoplastic resin therein. However, in those methods, since the viscosity of the resulting resin is largely increased, there are problems of deterioration in processability and reduction in quality caused by void generation or the like.

For example, there is proposed a method in which a copolymer of styrene-butadiene-methyl methacrylate or a block copolymer of butadiene-methyl methacrylate or the like is added as a thermoplastic resin to allow a fine phase-separated structure to be stably formed during the process of curing an epoxy resin, thereby largely improving the toughness of the resulting epoxy resin (WO 2006/077153).

Further, for example, there are known a method of preparing a prepreg in which a polyarylene sulfide is made into the form of a slurry in a dispersion medium to facilitate impregnation thereof into a glass fiber mat (JP H5-39371) and a method of producing a laminate without using a prepreg by preparing a sheet of a polyarylene sulfide having a relatively low molecular weight and laminating the sheet with a fiber base material (JP H9-25346).

Meanwhile, as a method of producing a fiber-reinforced composite material in which a thermoplastic resin is used as a matrix resin, there is known a method of producing an arbitrary molded article by using a molding material obtained by impregnating a reinforcement fiber with a thermoplastic resin, such as a prepreg, a yarn, a glass mat (GMT), a compound pellet or a long fiber pellet (for example, JP 2000-355629, JP 2003-80519 and JP 2010-121108). Since such molding material is easily molded because of the properties of thermoplastic resin and does not undergo curing during storage as in the case of thermosetting resins, such molding material does not impose a burden of storage and characteristically yields a molding article having high toughness and excellent recyclability.

In the method disclosed in WO '153, since the viscosity is largely increased by addition of a thermoplastic resin, processability of the resultant tends to be markedly impaired. Therefore, to minimize the effect on the processability, the amount of the thermoplastic resin to be added must be reduced so that the method is not likely to be able to impart an epoxy resin with sufficient toughness.

In the method disclosed in JP '371, not only equipment and time are required to dry a dispersion medium, but also it is difficult to remove the dispersion medium completely. Therefore, the method has a problem in that sufficient mechanical properties are not attained due to voids that are generated by evaporation of the dispersion medium at the time of lamination and molding. In addition, the method disclosed in JP '346 has problems in that the molding is required to be carried out at a high temperature and high pressure and that satisfactory mechanical properties are not attained due to a defect such as insufficient impregnation.

Furthermore, when a thermoplastic resin is used as disclosed in JP '629, JP '519 and JP '108, since the shape thereof cannot be retained at its melting temperature, the resin must be cooled in a mold so that there is a problem of a decrease in the cycle efficiency. Moreover, there is also known a method in which a melted resin is molded by pressing simultaneously with cooling thereof. However, since such a method requires a melting/heating apparatus to be introduced for melting and heating, there is a problem of an increased equipment investment.

In view of the above-described problems of prior art, it could be helpful to obtain a resin composition having good moldability and impregnation properties. It could also be helpful to provide a composite cured product comprising the resin composition which contains a reduced amount of voids and can be demolded even at its curing temperature.

SUMMARY

We provide a resin composition comprising 10 to 90% by mass of (A) a component to be polymerized containing a compound represented by Formula (1) and 90 to 10% by mass of (B) a thermosetting resin, the (A) and (B) each being capable of undergoing a reaction to increase the molecular weight by itself when heated:

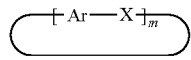

wherein, Ar represents an aryl; and X represents at least one selected from ethers, ketones, sulfides, sulfones, amides, carbonates and esters.

We further provide a method of producing a composite cured product which comprises allowing the above-described resin composition to react by heating to obtain a composite cured product and a method which comprises impregnating the above-described resin composition into a reinforcement fiber and then allowing the resin composition to react by heating.

Still further, we provide a composite cured product comprising 10 to 90% by mass of (A) a component to be polymerized containing a compound represented by Formula (1) and/or (A') a polymer obtained by polymerization of the (A) component to be polymerized alone and 90 to 10% by mass of (B') a cured product obtained by a reaction of (B) a thermosetting resin:

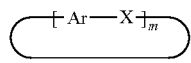

wherein, Ar represents an aryl; and X represents at least one selected from ethers, ketones, sulfides, sulfones, amides, carbonates and esters.

The resin composition has good moldability and impregnation properties. By using the resin composition, a composite cured product having a reduce amount of voids and being demoldable at its curing temperature can be produced. The composite cured product obtained by using the resin composition is extremely useful for a variety of parts and members such as those components, internal members, chassis and the like of electrical and electronic instruments, OA equipments, household electrical appliances, automobiles and airplanes.

DETAILED DESCRIPTION

The resin composition comprises (A) a component to be polymerized, which contains a compound represented by Formula (1) (hereinafter, the (A) component to be polymerized may be referred to as "the component (A)"), and (B) a thermosetting resin (hereinafter, the (B) thermosetting resin may be referred to as "the component (B)"), and the resin composition has a constitution in which the amount of the component (A) is 10 to 90% by mass and that of the component (B) is 90 to 10% by mass, taking the total amount of the components (A) and (B) as 100% by mass. Further, the components (A) and (B) are each capable of undergoing a reaction to increase the molecular weight by itself when heated. The term "component to be polymerized" refers to a component which is polymerized to constitute a polymer skeleton. By allowing the resin composition to undergo a reaction by heating, a composite cured product in which a thermoplastic resin and a cured thermoplastic resin are conjugated can be obtained.

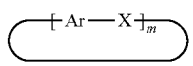

wherein, Ar represents an aryl; and X represents at least one selected from ethers, ketones, sulfides, sulfones, amides, carbonates and esters.

First, the respective constituents are described.

The compound of Formula (1) contains a repeating unit, —(Ar—X)—, as a main structural unit, preferably in an amount of not less than 80 mol %. The (A) component to be polymerized contains such compound in an amount of at least 50% by weight, preferably not less than 70% by weight, more preferably not less than 80% by weight, still more preferably not less than 90% by weight. Examples of Ar include those units that are represented by Formulae (2) to (10), among which a unit represented by Formula (2) is preferred. Further, examples of X include esters, carbonates, amides, ethers, ketones, sulfides and sulfones, and X can be selected in accordance with the properties of the composite cured product to be obtained. For example, esters, carbonates and amides tend to have excellent impact resistance, and ethers and ketones tend to have excellent durability and water resistance, while sulfides and sulfones tend to be excellent in the mechanical properties and flame retardancy.

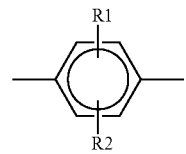

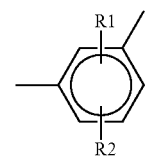

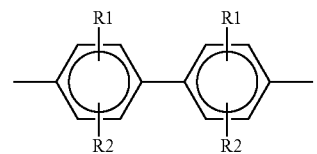

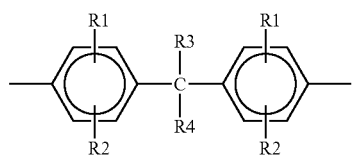

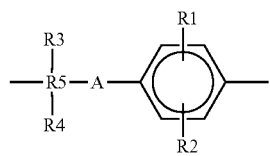

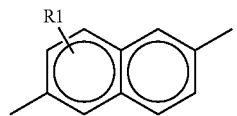

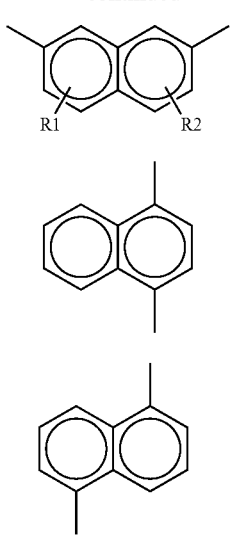

wherein, R1, R2, R3 and R4 each represent a substituent selected from a hydrogen, an alkyl group having 1 to 12 carbon atoms, an alkoxy group having 1 to 12 carbon atoms, an arylene group having 6 to 24 carbon atoms and a halogen group; R1, R2, R3 and R4 may be the same or different; and R5 represents an alkyl chain having 1 to 12 carbon atoms.

In the compound of Formula (1), different repeating units of —(Ar—X)— may be contained randomly or in blocks, or in the form of a mixture thereof. Further, the repeating units of Formulae (2) to (10) may also be contained randomly or in blocks, or in the form of a mixture thereof.

Representative examples of the compound of Formula (1) include cyclic polyphenylene sulfides, cyclic polyphenylene sulfide sulfones, cyclic polyphenylene sulfide ketones, cyclic polyphenylene ether ketones, cyclic polyphenylene ether ether ketones, cyclic polyphenylene ether sulfones, cyclic aromatic polycarbonates, cyclic polyethylene terephthalates and cyclic polybutylene terephthalates, as well as cyclic random copolymers and cyclic block copolymers that contain these compounds. Examples of particularly preferred compound of Formula (1) include cyclic compounds containing, as a main structural unit, the p-phenylene sulfide unit represented by Formula (11) in an amount of not less than 80 mol %, particularly not less than 90 mol %:

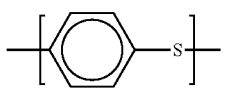

The number of repetitions, m, in Formula (1) is not particularly restricted. However, it is, for example, preferably 2 to 50, more preferably 2 to 25, still more preferably 2 to 15. As described below, the conversion of a component (A) into a polymer (A') by heating is preferably performed at or above the temperature at which the component (A) melts. However, the larger the m is, the more likely the melting temperature of the component (A) is to become high; therefore, it is advantageous to control number of repetitions, m, in the above-described range such that the conversion of the component (A) into the polymer (A') can be performed at a lower temperature.

Further, the component (A) may contain, as the compound of Formula (1), either a single compound having a single number of repetitions or a mixture of cyclic compounds having different numbers of repetitions. However, a mixture of cyclic compounds having different numbers of repetition is more preferred because it tends to have a lower melting temperature than that of a single compound having a single number of repetitions and the use of a mixture of cyclic compounds having different numbers of repetition can lower the temperature at which the conversion of the component (A) into the polymer (A') is performed.

In addition to the compound of Formula (1), the component (A) may also contain an oligomer having a repeating unit, —(Ar—X)—, as a main structural unit. The oligomer is preferably a linear homo-oligomer or co-oligomer which contains the repeating unit in an amount of not less than 80 mol %. Examples of Ar include the units of Formulae (2) to (10). As long as the component (A) contains the repeating unit, —(Ar—X)—, as a main structural unit, the component (A) may contain a small amount of a branch unit or cross-linking unit which is represented by Formula (12) or the like:

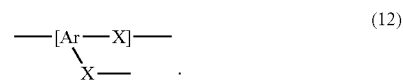

It is preferred that the amount of such branch unit or cross-linking unit to be copolymerized be in the range of 0 to 1 mol % with respect to 1 mol of the unit, —(Ar—X)—. Further, the above-described oligomer may also be any of a random copolymer, a block copolymer and a mixture thereof, which contain the above-described repeating unit.

Representative examples thereof include polyphenylene sulfide oligomers, polyphenylene sulfide sulfone oligomers, polyphenylene sulfide ketone oligomers, polyphenylene ether ketone oligomers, polyphenylene ether ether ketone oligomers, polyphenylene ether sulfone oligomers, aromatic polycarbonate oligomers, polyethylene terephthalate oligomers and polybutylene terephthalate oligomers, as well as random copolymers, block copolymers and mixtures of these compounds. Examples of particularly preferred oligomer include polyphenylene sulfide oligomers containing a p-phenylene sulfide unit as a main structural unit of the polymer in an amount of not less than 80 mol %, particularly not less than 90 mol %.

The above-described oligomer has a molecular weight of, in terms of weight-average molecular weight, preferably less than 10,000, more preferably less than 8,000, still more preferably less than 5,000. Meanwhile, the lower limit of the weight-average molecular weight of the above-described oligomer is preferably not less than 300, more preferably not less 400, still more preferably not less than 500.

In cases where the component (A) contains the above-described oligomer, it is particularly preferred that the amount of the oligomer be less than that of the compound of Formula (1). That is, in the component (A), the weight ratio of the compound of Formula (1) to the above-described oligomer (the compound of Formula (1)/the oligomer) be preferably higher than 1, more preferably not less than 2.3, still more preferably not less than 4, yet still more preferably not less than 9. By using such component (A), a polymer (A') having a weight-average molecular weight of not less than 10,000 can be easily obtained.

The polymer (A') obtained by such component (A) is a homopolymer or a copolymer which contains a repeating unit, —(Ar—X)—, as a main structural unit, preferably in an amount of not less than 80 mol %. Examples of Ar include those units that are represented by Formulae (2) to (10), among which a unit represented by Formula (2) is particularly preferred. Further, examples of X include esters, carbonates, amides, ethers, ketones, sulfides and sulfones, and X can be selected in accordance with the properties of the composite cured product to be obtained. For example, esters, carbonates and amides tend to have excellent impact resistance, and ethers and ketones tend to have excellent durability and water resistance, while sulfides and sulfones tend to be excellent in the mechanical properties and flame retardancy.

As long as the polymer (A') contains this repeating unit as a main structural unit, the polymer (A') may contain a small amount of a branch unit or cross-linking unit which is represented by Formula (12) or the like. It is preferred that the amount of such branch unit or cross-linking unit to be copolymerized be 0 to 1 mol % with respect to 1 mol of the unit, —(Ar—X)—.

Further, the polymer (A') may also be any of a random copolymer, a block copolymer and a mixture thereof, which contain the above-described repeating unit.

Representative examples thereof include polyphenylene sulfides, polyphenylene sulfide sulfones, polyphenylene sulfide ketones, polyphenylene ether ketones, polyphenylene ether ether ketones, polyphenylene ether sulfones, aromatic polycarbonates, polyethylene terephthalates and polybutylene terephthalates, as well as random copolymers, block copolymers and mixtures of these compounds. Examples of particularly preferred polymer include polyphenylene sulfides containing, as a main structural unit of the polymer, the p-phenylene sulfide unit of Formula (11) in an amount of not less than 80 mol %, particularly not less than 90 mol %.

The polymer (A') has a molecular weight of, in terms of weight-average molecular weight, preferably not less than 10,000, more preferably not less than 15,000, still more preferably not less than 17,000. When the weight-average molecular weight is not less than 10,000, the resulting composite cured product exhibits excellent properties such as toughness and flame retardancy.

Further, when the component (A) is converted into the polymer (A'), the conversion rate is preferably not less than 70%, more preferably not less than 80%, still more preferably not less than 90%. When the conversion rate is not less than 70%, the resulting polymer (A') can have the above-described properties.

The polymer (A') is obtained by increasing the molecular weight of the component (A) with heating and this reaction may be facilitated by using a compound having an ability to generate radicals or the like as a polymerization catalyst. As such a polymerization catalyst, a zero-valent transition metal compound is preferred. It is preferred that the component (A) be heated in the presence of a zero-valent transition metal compound since the polymer (A') can be thereby easily obtained.

As a zero-valent transition metal, a metal belonging to Groups 8 to 11 and Periods 4 to 6 of the periodic table is preferably employed. Examples of such metal species include nickel, palladium, platinum, iron, ruthenium, rhodium, copper, silver and gold. As the zero-valent transition metal compound, various complexes are suitable, and examples thereof include complexes containing, as a ligand, triphenylphosphine, tri-t-butylphosphine, tricyclohexylphosphine, 1,2-bis(diphenylphosphino)ethane, 1,1'-bis(diphenylphosphino)ferrocene, dibenzylideneacetone, dimethoxydibenzylideneacetone, cyclooctadiene or carbonyl. Specific examples include bis(dibenzylideneacetone) palladium, tris(dibenzylideneacetone)dipalladium, tetrakis(triphenylphosphine)palladium, bis(tri-t-butylphosphine) palladium, bis[1,2-bis(diphenylphosphino)ethane] palladium, bis(tricyclohexylphosphine)palladium, [P,P'-1,3-bis(di-i-propylphosphino)propane][P-1,3-bis(di-i-propylphosphino)propane]palladium, 1,3-bis(2,6-di-i-propylphenyl)imidazol-2-ylidene(1,4-naphthoquinone) palladium dimer, 1,3-bis(2,4,6-trimethylphenyl)imidazol-2-ylidene(1,4-naphthoquinone)palladium dimer, bis(3,5,3',5'-dimethoxydibenzylideneacetone)palladium, bis(tri-t-butylphosphine)platinum, tetrakis(triphenylphosphine) platinum, tetrakis(trifluorophosphine)platinum, ethylenebis(triphenylphosphine)platinum, platinum-2,4,6,8-tetramethyl-2,4,6,8-tetravinylcyclotetrasiloxane complex, tetrakis(triphenylphosphine)nickel, tetrakis(triphenylphosphite)nickel, bis(1,5-cyclooctadiene)nickel, triiron dodecacarbonyl, iron pentacarbonyl, tetrarhodium dodecacarbonyl, hexarhodium hexadecacarbonyl and triruthenium dodecacarbonyl. These polymerization catalysts may be used individually, or two or more thereof may be used as a mixture or in combination.

As such polymerization catalyst, the above-described zero-valent transition metal compound may be added, or the zero-valent transition metal compound may be formed in the system. Examples of a method of forming a zero-valent transition metal compound within the system as in the latter case include a method of forming a complex of a transition metal within the system by adding a transition metal compound such as a salt of a transition metal and a compound functioning as a ligand and a method in which a complex formed by a transition metal compound such as a salt of a transition metal and a compound functioning as a ligand is added. Since non-zero-valent transition metal salts do not facilitate the conversion of the component (A), a compound functioning as a ligand is required to be added. Examples of a transition metal compound, ligand and complex formed by a transition metal compound and a ligand are listed below. Examples of a transition metal compound for forming a zero-valent transition metal compound in the system include acetates and halides of various transition metals. Examples of transition metal species include acetates and halides of nickel, palladium, platinum, iron, ruthenium, rhodium, copper, silver and gold, and specific examples thereof include nickel acetate, nickel chloride, nickel bromide, nickel iodide, nickel sulfide, palladium acetate, palladium chloride, palladium bromide, palladium iodide, palladium sulfide, platinum chloride, platinum bromide, iron acetate, iron chloride, iron bromide, iron iodide, ruthenium acetate, ruthenium chloride, ruthenium bromide, rhodium acetate, rhodium chloride, rhodium bromide, copper acetate, copper chloride, copper bromide, silver acetate, silver chloride, silver bromide, gold acetate, gold chloride and gold bromide. Further, the ligand to be added simultaneously to form a zero-valent transition metal compound in the system is not particularly restricted as long as it generates a zero-valent transition metal when the compound (A) and the transition metal compound are heated. However, the ligand is preferably a basic compound and examples thereof include triphenylphosphine, tri-t-butylphosphine, tricyclohexylphosphine, 1,2-bis(diphenylphosphino)ethane, 1,1'-bis(diphenylphosphino)ferrocene, dibenzylideneacetone, sodium carbonate and ethylenediamine. Moreover, examples of a complex formed by a transition metal compound and a compound functioning as a ligand include complexes composed of the above-described various transition metal salts and ligands. Specific examples of such complexes include bis(triphenylphosphine) palladium diacetate, bis(triphenylphosphine)palladium dichloride, [1,2-bis(diphenylphosphino)ethane]palladium dichloride, [1,1'-bis(diphenylphosphino)ferrocene]palladium dichloride, dichloro(1,5'-cyclooctadiene)palladium, bis(ethylenediamine)palladium dichloride, bis(triphenylphosphine)nickel dichloride, [1,2-bis(diphenylphosphino)ethane]nickel dichloride, [1,1'-bis(diphenylphosphino)ferrocene]nickel dichloride and dichloro(1,5'-cyclooctadiene)platinum. These polymerization catalysts and ligands may be used individually, or two or more thereof may be used as a mixture or in combination.

The valence state of a transition metal compound can be determined by X-ray absorption fine structure (XAFS) analysis. The transition metal compound, the mixture of a transition metal compound and the component (A) or the mixture of a transition metal compound and the polymer (A'), which is used as a catalyst, can be analyzed by irradiating an X-ray and comparing the peak maxima of the absorption coefficient in normalized absorption spectra.

For example, when evaluating the valence of a palladium compound, it is effective to compare absorption spectra relating to X-ray absorption near-edge structure (XANES) of the L3 edge (Pd-$L_3$ edge XANES), and the valence can be determined by comparing the peak maxima of absorption coefficient that are obtained when the point at which the energy of the X-ray is 3,173 eV is taken as reference and the average absorption coefficient of 3,163 to 3,168 eV and the average absorption coefficient of 3,191 to 3,200 eV are normalized to be 0 and 1, respectively. In the case of palladium, a zero-valent palladium compound tends to show a smaller peak maximum of normalized absorption coefficient as compared to a divalent palladium compound, and a transition metal compound having a greater effect of facilitating the conversion of cyclic polyarylene sulfide tends to show a smaller peak maximum. This is speculated to be because an absorption spectrum relating to XANES corresponds to the transition of an inner-shell electron to a vacant orbital and the absorption peak intensity is influence by the electron density of the d-orbital.

To allow a palladium compound to facilitate the conversion of the component (A) into the polymer (A'), the peak maximum of normalized absorption coefficient is preferably not larger than 6, more preferably not larger than 4, still more preferably not larger than 3, and in this range, the conversion of the component (A) can be facilitated.

Specifically, divalent palladium chloride which does not facilitate the conversion of the component (A) shows a peak maximum of 6.32, while zero-valent tris(dibenzylideneacetone)dipalladium, tetrakis(triphenylphosphine)palladium and bis[1,2-bis(diphenylphosphino)ethane]palladium that facilitate the conversion of the component (A) show a peak maximum of 3.43, 2.99 and 2.07, respectively.

Further, as the polymerization catalyst of the component (A), an anionic polymerization initiator is also preferred. The anionic polymerization initiator may be, for example, an alkali metal salt such as an inorganic alkali metal salt or an organic alkali metal salt. Examples of the inorganic alkali metal salt include alkali metal halides such as sodium fluoride, potassium fluoride, cesium fluoride and lithium chloride, and examples of the organic alkali metal salt include alkali metal alkoxides such as sodium methoxide, potassium methoxide, sodium ethoxide, potassium ethoxide, sodium tert-butoxide and potassium tert-butoxide; alkali metal phenoxides such as sodium phenoxide, potassium phenoxide, sodium-4-phenoxyphenoxide and potassium-4-phenoxyphenoxide; and alkali metal acetates such as lithium acetate, sodium acetate and potassium acetate.

The concentration at which the polymerization catalyst is used varies depending on the desired molecular weight of the polymer (A') and the type of the polymerization catalyst. However, it is usually 0.001 to 20 mol %, preferably 0.005 to 15 mol %, more preferably 0.01 to 10 mol %, with respect to the amount of X in the component (A). When the concentration is 0.001 mol % or higher, the component (A) is sufficiently converted into the polymer (A'), and when the concentration is 20 mol % or less, the resulting polymer (A') can have the above-described properties.

The above-described polymerization catalyst may be added as is, and after being added to the component (A), it is preferred that the polymerization catalyst be uniformly dispersed in the resulting mixture. Examples of a method of uniformly dispersing the polymerization catalyst include a mechanical dispersion method and a dispersion method using a solvent. Specific examples of the mechanical dispersion method include those methods utilizing a pulverizer, a stirrer, a mixer, a shaker or a mortar, and specific examples of the dispersion method using a solvent include a method in which the component (A) is dissolved or dispersed in an appropriate solvent and a prescribed amount of polymerization catalyst is added thereto, followed by removal of the solvent. Further, in cases where the polymerization catalyst is in the form of a solid when dispersed, to allow more uniform dispersion, it is preferred that the polymerization catalyst have an average particle size of not larger than 1 mm.

The component (B) is not particularly restricted, and examples thereof include epoxy resins, vinylester resins, phenol resins, bismaleimide resins, cyanate ester resins and polyimide resins.

The term "thermosetting resin" used herein refers to a resin which undergoes a three-dimensional crosslinking reaction and increases its molecular weight when heated again. For example, in epoxy resins, so-called "base compound" such as bisphenol A diglycidyl ether alone cannot be made into a macromolecule by ordinary heating. Therefore, such a compound cannot be considered as a thermosetting resin and it can be made into a thermosetting resin by mixing a curing agent and/or a catalyst. Among the above-described resins, from the standpoint of heat resistance, epoxy resins, bismaleimide resins and polyimide resins are preferred.

Further, the component (B) may also contain other filler(s) or additive(s) in such an amount which does not adversely affect the composition.

Examples thereof include an inorganic filler, a flame retardant, a conductivity-imparting agent, a crystal nucleating agent, an ultraviolet absorber, an antioxidant, a damping agent, an antibacterial agent, an insect repellent, a deodorizer, a coloring inhibitor, a heat stabilizer, a mold releasing agent, an antistatic agent, a plasticizer, a lubricant, a coloring agent, a pigment, a dye, a foaming agent, an anti-foaming agent and a coupling agent.

The resin composition comprises, taking the total amount of the components (A) and (B) as 100% by mass, 10 to 90% by mass of the component (A) and 90 to 10% by mass of the component (B), preferably 15 to 85% by mass of the component (A) and 85 to 15% by mass of the component (B), more preferably 25 to 75% by mass of the component (A) and 75 to 25% by mass of the component (B). By containing the component (A) in an amount of 10 to 90% by mass, the resin composition can have improved properties as a thermoplastic resin such as toughness and flame retardancy, and by containing the component (B) in an amount of 90 to 10% by mass, the resin composition can be demolded even at its curing temperature.

Further, the resin composition may also contain (C) a reinforcement fiber (hereinafter, the (C) reinforcement fiber may be referred to as "the component (C)") in such an amount which does not adversely affect the composition.

The component (C) is not particularly restricted, and fibers having high strength and high elastic modulus such as carbon fibers, glass fibers, aramid fibers, alumina fibers, silicon carbide fibers, boron fibers and metal fibers, can be employed. These fibers may be used individually, or two or more thereof may be used in combination. Thereamong, from the standpoint of the effects of improving the dynamic properties and reducing the weight of the resulting molded article, carbon fibers such as PAN-based carbon fibers, pitch-based carbon fibers and rayon-based carbon fibers are preferred and, from the standpoint of the balance between the strength and the elastic modulus of the resulting molded article, PAN-based carbon fibers are more preferred. Further, for the purpose of imparting electrical conductivity, a reinforcement fiber coated with a metal such as nickel, copper or ytterbium can also be used.

The morphology and alignment of the component (C) are not particularly restricted. As the component (C), for example, a fiber structure such as a unidirectionally-paralleled continuous fiber, a single tow, a fabric, a knit, a nonwoven fabric, a mat or a braided. In particular, for those applications where a high specific strength and a high specific elastic modulus are required, it is preferred that the component (C) be in the form of a continuous fiber. In this case, a reinforcement fiber having a unidirectionally-paralleled alignment is most suitable. However, an alignment of a cloth (fabric) is also suitable because of its ease of handling.

A composite cured product is produced by allowing the above-described resin composition to react by heating.

First, as a step (I), a resin composition is obtained by mixing the above-described components (A) and (B). The step (I) is not particularly restricted as long as the above-described components (A) and (B) are uniformly dispersed. Examples of a method for attaining uniform dispersion include a method in which the components (A) and (B) are heat-melted to be dispersed; a method in which the components (A) and (B) are mechanically dispersed; and a method in which the components (A) and (B) are dispersed using a solvent. Thereamong, a method in which the components (A) and (B) are heat-melted to be dispersed is preferred, and specific examples of such method include the use of an extruder, a kneader or the like. In this case, it is preferred that the heating temperature be not higher than the reaction temperature of the components (A) and (B). Further, when the reaction temperature is lower than the melting point of either the component (A) or the component (B), it is preferred that a curing agent and/or a catalyst be added and mixed after cooling the reaction product.

Next, as a step (II), a composite cured product is obtained by allowing the thus obtained resin composition to react by heating. The conditions in the step (II) affect the above-described conversion rate of the component (A) into the polymer (A') in the resulting composite cured product. When the component (B) undergoes reaction and curing before the reaction of the component (A) progresses, the component (A) remains as is in the resulting composite cured product. On the other hand, when the component (B) undergoes reaction and curing simultaneously with or after the reaction of the component (A), the component (A) remains in the form of being converted into the polymer (A') in the resulting composite cured product.

Further, a specific heating temperature in the production of a composite cured product cannot be unambiguously indicated because it varies depending on the constitution and molecular weight of the resin composition as well as the environment in which the heating is performed. However, the heating temperature is, for example, not lower than 100° C., preferably not lower than 120° C., more preferably not lower than 150° C., still more preferably not lower than 180° C. By applying this heating temperature range of the lower limit, a composite cured product can be obtained in a short time. Also, since a side reaction such as decomposition reaction is not likely to occur, deterioration in the properties of the resulting composite cured product can be inhibited. The upper limit of the heating temperature is, for example, not higher than 450° C., preferably not higher than 400° C., more preferably not higher than 380° C., still more preferably not higher than 360° C., particularly preferably not higher than 300° C. By applying this heating temperature range of the upper limit, adverse effects such as decomposition reaction are likely to be inhibited.

The reaction time cannot be generally prescribed because it varies depending on the properties of the components (A) and (B) to be used and the conditions such as heating temperature. However, it is preferred that the reaction time be set such that decomposition reaction and the like is inhibited as much as possible. The heating time is, for example, 0.01 to 100 hours, preferably 0.05 to 20 hours, more preferably 0.05 to 10 hours. Using the preferred resin composition, the heating can be performed in 2 hours or less. Examples of the heating time include not longer than 2 hours, not longer than 1 hour, not longer than 0.5 hour, not longer than 0.3 hour and not longer than 0.2 hour.

Further, the conversion of the resin composition into a composite cured product can be performed in a condition where substantially no solvent is present. When the conversion is performed in such a condition, the resin composition can be heated in a short time and a high reaction rate is attained so that a composite cured product is likely to be obtained in a short time. The term "condition where substantially no solvent is present" means that the amount of a solvent in the resin composition is not greater than 10% by weight, more preferably not greater than 3% by weight, still more preferably not greater than 1% by weight.

It is preferred that the heating be performed in a non-oxidizing atmosphere. By performing the heating in a non-oxidizing atmosphere, occurrence of undesirable side reactions such as crosslinking reaction and decomposition reactions tends to be inhibited. The term "a non-oxidizing atmosphere" used herein refers to an atmosphere having an oxygen concentration of not higher than 5% by volume, preferably not higher than 2% by volume and more preferably an atmosphere which contains substantially no oxygen, that is, an inert gas atmosphere such as nitrogen, helium or argon. Thereamong, particularly from the standpoints of economical efficiency and ease of handling, a nitrogen atmosphere is preferred. Further, the heating can be performed under increased pressure as well. In cases where the heating is performed under increased pressure, it is preferred that the pressure be increased after a non-oxidizing atmosphere is established in the reaction system. The term "under increased pressure" means that the system in which the reaction is carried out is higher than the atmospheric pressure. The upper limit of the pressure is not particularly restricted. However, from the standpoint of the ease of handling the reaction apparatus, the pressure is preferably not higher than 0.2 MPa. When the heating is performed in such a condition, the polymerization catalyst is not likely to be vaporized at the time of the heating, so that a composite cured product can be obtained in a short time.

Further, in the case of a resin composition containing the component (C) in addition to the above-described components (A) and (B), the resin composition is preferably obtained by performing a step (I') in which a mixture obtained in the step (I) is impregnated into the component (C) and then the step (II). Thereafter, a composite cured product is obtained by allowing such resin composition to react by heating.

The step of impregnating a mixture obtained in the step (I) is not particularly restricted, and a method in which the component (C) is immersed into melted components (A) and (B) or a method in which the component (C) is immersed into the components (A) and (B) that are dissolved in a solvent and the solvent is subsequently evaporated can be employed.

Further, in cases where the component (C) is a unidirectionally-paralleled continuous fiber, the component (C) may be subjected to opening in advance before the above-described step (I'). The term "opening" used herein refers to an operation which separates the filaments of the component (C) and such opening operation is expected to have an effect of further improving the impregnation properties of the resin composition. The method of opening the fiber of the component (C) is not particularly restricted and, for example, a method in which a concave-convex roll pair is passed through the fiber alternately, a method in which a drum-type roll is used, a method in which tension fluctuation is applied to axial oscillation, a method in which the tension of the component (C) is made to fluctuate using two friction bodies that moves vertically back and forth or a method in which air is blown against the component (C) can be employed.

The method of molding the resin composition is not particularly restricted. A molding method having excellent productivity such as injection molding, autoclave molding, press molding, filament winding molding, stamping molding or resin transfer molding (RTM), can be employed, and these molding methods can also be used in combination.

A composite cured product obtained by curing the resin composition comprises, taking the total amount of the above-described component (A) and/or the polymer (A') obtained by polymerization of the component (A) alone and a cured product (B') obtained by reaction of the above-described component (B) as 100% by mass, usually 10 to 90% by mass of the component (A) and/or the polymer (A') and 90 to 10% by mass of the cured product (B'), preferably 15 to 85% by mass of the component (A) and/or the polymer (A') and 85 to 15% by mass of the cured product (B'), more preferably 25 to 75% by mass of the component (A) and/or the polymer (A') and 75 to 25% by mass of the cured product (B'). By containing the component (A) and/or the polymer (A') in an amount of 10 to 90% by mass, the properties as a thermoplastic resin, such as toughness and flame retardancy, can be improved and, by containing the cured product (B') in an amount of 90 to 10% by mass, the composite cured product can be demolded even at its curing temperature. It is preferred that the component (A) be converted into the polymer (A') in the component (B'). However, the effect of improving the properties can be attained at a certain level even when the component (A) exists as is in the composite cured product.

Examples of the molded article obtained by the above-described molding method include components, members and outer plates of automobiles such as various modules (e.g., instrument panel, door beam, undercover, lamp housing, pedal housing, radiator support, spare tire cover and front-end spoiler), cylinder head covers, bearing retainers, intake manifolds and pedals; airplane-related components, members and outer plates, such as landing gear pods, winglets, spoilers, edges, ladders, fairings and ribs; tools such as monkey wrenches; household/office electric appliances and components, such as telephones, facsimiles, VTRs, copiers, TVs, microwave ovens, acoustic equipments, toiletry goods, optical disks, refrigerators and air conditioners; and components of electrical/electronic instruments that are represented by chassis used in personal computers and cell phones and keyboard supports that support a keyboard in a personal computer.

EXAMPLES

Our compositions, products and methods will now be described more concretely by way of examples thereof. However, this disclosure is not restricted to the following examples.

(1) Evaluation of Demoldability of Composite Cured Product

An evaluation of "not demoldable" was given when an obtained composite cured product was melted and could not retain the shape when heated again to its curing temperature.

(2) Measurement of Porosity of Composite Cured Product

For the standard which was evaluated to be "demoldable" in the above-described (1), the porosity (%) of composite cured product was determined in accordance with the test method of ASTM D2734 (1997).

The porosity of a composite cured product was evaluated based on the following criteria, where evaluations of "A" to "C" were satisfactory:
A: 0 to less than 10%
B: 10% to less than 20%
C: 20% to less than 40%
D: not less than 40%.

Reference Example 1

(Preparation of Cyclic Polyphenylene Sulfides (A)-1 and (A)-2)

Preparation of (A)-1

To a stainless-steel autoclave equipped with a stirrer, 14.03 g (0.120 mol) of a 48%-by-weight aqueous solution of sodium hydrosulfide, 12.50 g (0.144 mol) of a 48%-by-weight aqueous solution prepared using 96% sodium hydroxide, 615.0 g (6.20 mol) of N-methyl-2-pyrrolidone (NMP) and 18.08 g (0.123 mol) of p-dichlorobenzene (p-DCB) were loaded. The reaction vessel was thoroughly replaced with nitrogen and then hermetically sealed under nitrogen gas.

While stirring the loaded materials at 400 rpm, the temperature of the reaction mixture was raised from room temperature to 200° C. over a period of about 1 hour. At this point, the pressure inside the reaction vessel was 0.35 MPa in terms of gauge pressure. Then, the temperature of the reaction vessel was further raised from 200° C. to 270° C. over a period of about 30 minutes. The pressure inside the reaction vessel at this point was 1.05 MPa in terms of gauge pressure. After retaining the reaction vessel at 270° C. for 1 hour, the reaction vessel was rapidly cooled to near room temperature, and the contents were then recovered.

The thus obtained contents were analyzed by gas chromatography and high-performance liquid chromatography. As a result, it was found that the consumption rate of the monomer, p-DCB, was 93% and that the production rate of a cyclic PPS was 18.5%, assuming that all of the sulfur components in the reaction mixture were converted into cyclic PPS.

After diluting 500 g of the thus obtained contents with about 1,500 g of ion exchanged water, the resultant was filtered through a glass filter having an average mesh opening size of 10 to 16 μm. The components deposited on the filter were dispersed in about 300 g of ion exchanged water and the resulting dispersion was stirred at 70° C. for 30 minutes. The same filtering operation as described in the above was repeated for a total of three times to obtain a white solid. This white solid was then vacuum-dried at 80° C. overnight to obtain a dry solid.

The thus obtained solid was loaded to an extraction thimble and low-molecular-weight components contained in the solid were separated by performing Soxhlet extraction for about 5 hours using chloroform as a solvent.

After the extraction operation, the solid component remaining in the extraction thimble was dried at 70° C. overnight under reduced pressure to obtain an off-white solid in an amount of about 6.98 g. As a result of infrared spectroscopic analysis, based on the absorption spectrum, it was found that the thus obtained off-white solid was a compound having a phenylene sulfide structure and had a weight-average molecular weight of 6,300.

After removing the solvent from the extract obtained by the extraction operation with chloroform, about 5 g of chloroform was added to the resulting extract to prepare a slurry, which was then added dropwise with stirring to about 300 g of methanol. The resulting precipitate was recovered by filtration and vacuum-dried at 70° C. for 5 hours to obtain a white powder in an amount of 1.19 g. From an absorption spectrum obtained by infrared spectroscopic analysis, the thus obtained white powder was confirmed to be a compound composed of phenylene sulfide units. In addition, based on mass spectrum analysis (apparatus: M-1200H, manufactured by Hitachi, Ltd.) of the components that were resolved by high-performance liquid chromatography and the molecular weight information obtained by MALDI-TOF-MS, the white powder was found to be a compound (A)-1, which contains about 99% by weight of a cyclic compound having p-phenylene sulfide unit as a main structural unit with a number of repeating units of 4 to 13. Further, as a result of GPC measurement, the (A)-1 was shown to be completely soluble to 1-chloronaphthalene at room temperature and have a weight-average molecular weight of 900.

Preparation of (A)-2

To the (A)-1 obtained in the above-described manner, tetrakis(triphenylphosphine)palladium was mixed in an amount of 1 mol % with respect to the amount of sulfur atom contained in the (A)-1, thereby preparing a compound (A)-2.

Reference Example 2

Preparation of Cyclic Polyphenylene Ether Ether Ketone (A)-3

The synthesis of a polyphenylene ether ether ketone performed in accordance with a common method disclosed in examples of Japanese Translated PCT Patent Application Laid-open No. 2007-506833 is described.

To a four-necked flask equipped with a stirrer, a nitrogen introduction pipe, a Dean-Stark apparatus, a condenser tube and a thermometer, 22.5 g (103 mmol) of 4,4'-difluorobenzophenone, 11.0 g (100 mmol) of hydroquinone and 49 g of diphenyl sulfone were loaded. The amount of diphenyl sulfone was about 0.16 L with respect to 1.0 mol of the benzene ring component contained in the resulting mixture. When the mixture was heated to 140° C. under nitrogen gas flow, an almost colorless solution was formed. At this temperature, 10.6 g (100 mmol) of anhydrous sodium carbonate and 0.28 g (2 mmol) of anhydrous potassium carbonate were added thereto. The resulting mixture was heated and retained at 200° C. for 1 hour and then further heated and retained at 250° C. for 1 hour. Thereafter, the mixture was further heated and retained at 315° C. for 3 hours.

The resulting reaction mixture was analyzed by high-performance liquid chromatography. As a result, it was found that only a trace amount of a cyclic polyphenylene ether ether ketone mixture was obtained at a yield of less than 1% with respect to the amount of hydroquinone.

The thus obtained reaction mixture was allowed to cool, pulverized and then washed with water and acetone to remove by-product salts and diphenyl sulfone. The thus obtained polymer was dried in a hot-air dryer at 120° C. to obtain a powder.

Next, about 1.0 g of the thus obtained powder was subjected to Soxhlet extraction with 100 g of chloroform at a bath temperature of 80° C. for 5 hours. Chloroform was removed from the resulting extract using an evaporator to obtain a small amount of a chloroform-soluble component. The yield of the thus obtained chloroform-soluble component was 1.2% with respect to the amount of hydroquinone used in the reaction. As a result of analyzing the chloroform-soluble component by high-performance liquid chromatography, it was found that the chloroform-soluble component contained a cyclic polyphenylene ether ether ketone and a linear polyphenylene ether ether ketone oligomer. This linear polyphenylene ether ether ketone oligomer is a compound which has properties such as solvent solubility that are similar to those of cyclic polyphenylene ether ether ketone and is, therefore, not easily separated from cyclic polyphenylene ether ether ketone. The cyclic polyphenylene ether ether ketone mixture contained in the thus recovered chloroform-soluble component was found to be a compound (A)-3, which is composed of cyclic polyphenylene ether ether ketones having a number of repetitions (m) of 4 and 5, with the cyclic polyphenylene ether ether ketone having a number of repetitions (m) of 4 accounting for not less than 80% in terms of weight ratio. Further, the compound (A)-3 had a melting point of about 320° C.

Reference Example 3

Preparation of Cyclic Polyphenylene Ether Ether Ketones (A)-4 and (A)-5

Preparation of (A)-4

To a four-necked flask equipped with a stirrer, a nitrogen introduction pipe, a Dean-Stark apparatus, a condenser tube and a thermometer, 2.40 g (11 mmol) of 4,4'-difluorobenzophenone, 1.10 g (10 mmol) of hydroquinone, 1.52 g (11 mmol) of anhydrous potassium carbonate, 100 mL of dimethyl sulfoxide and 10 mL of toluene were loaded. The amount of dimethyl sulfoxide was 3.13 L with respect to 1.0 mol of the benzene ring component contained in the resulting mixture. The mixture was heated to 140° C. under nitrogen gas flow and retained at 140° C. for 1 hour. Then, the mixture was further heated and retained at 160° C. for 4 hours to perform a reaction. After completion of the reaction, the resulting mixture was cooled to room temperature to prepare a reaction mixture.

About 0.2 g of the thus obtained reaction mixture was weighed and diluted with 4.5 g of THF. The resultant was filtered to separate and remove THF-insoluble components to prepare a sample for high-performance liquid chromatography analysis, which was then used to analyze the reaction mixture. As a result, it was confirmed that five types of continuous cyclic polyphenylene ether ether ketones having a number of repetitions (m) of 2 to 6 were generated and the yield of polyphenylene ether ether ketone oligomer was found to be 15.3% with respect to the amount of hydroquinone.

Then, 50 g of the reaction mixture obtained in this manner was aliquoted and 150 g of 1%-by-weight aqueous acetic acid solution was added thereto. The resultant was made into the form of a slurry by stirring and then heated to 70° C. to continue stirring for another 30 minutes. The resulting slurry was filtered through a glass filter average pore size: 10 to 16 μm) to obtain solids. Then, an operation of dispersing the thus obtained solids in 50 g of deionized water, retaining the resulting dispersion at 70° C. for 30 minutes and filtering the dispersion to recover solids was repeated for a total of three times. The thus obtained solids were vacuum-dried at 70° C. overnight to obtain a dry solid in an amount of about 1.24 g.

Then, 1.0 g of the thus obtained dry solid was subjected to Soxhlet extraction with 100 g of chloroform at a bath temperature of 80° C. for 5 hours. Chloroform was removed from the resulting extract using an evaporator to obtain solids. After adding 2 g of chloroform to the thus obtained solids, the resulting mixture was made into a dispersion using an ultrasonic washer and then added dropwise to 30 g of methanol. The resulting precipitated component was separated by filtration through a filter paper having an average pore size of 1 μm and then vacuum-dried at 70° C. for 3 hours to obtain a white solid in an amount of 0.14 g. The yield thereof was 14.0% with respect to the amount of hydroquinone used in the reaction.

From an absorption spectrum obtained by infrared spectroscopic analysis, the thus obtained white powder was confirmed to be a compound composed of phenylene ether ketone units. In addition, based on mass spectrum analysis (apparatus: M-1200H, manufactured by Hitachi, Ltd.) of the components that were resolved by high-performance liquid chromatography and the molecular weight information obtained by MALDI-TOF-MS, the white powder was found to be a polyphenylene ether ether ketone oligomer (A)-4 which contains, as a main component, a mixture of five types of continuous cyclic polyphenylene ether ether ketones having a number of repetitions (m) of 2 to 6. Further, the weight ratio of the cyclic polyphenylene ether ether ketone mixture in the oligomer (A)-4 was found to be 81%. It is noted here that the (A)-4 contained a linear polyphenylene ether ether ketone oligomer in addition to the cyclic polyphenylene ether ether ketones. As a result of measuring the melting point of the (A)-4, it was found to be 163° C. Moreover, as a result of reduced viscosity measurement, the (A)-4 was found to have a reduced viscosity of less than 0.02 dL/g.

Further, the chloroform-insoluble solid component obtained in the above-described recovery of the polyphenylene ether ether ketone oligomer (A)-4 by Soxhlet extraction was vacuum-dried at 70° C. overnight to obtain an off-white solid in an amount of about 0.85 g. As a result of infrared spectroscopic analysis, based on the absorption spectrum, it was found that the thus obtained off-white solid was a linear polyphenylene ether ether ketone. In addition, as a result of reduced viscosity measurement, this linear polyphenylene ether ether ketone was found to have a reduced viscosity of less than 0.45 dL/g.

Preparation of (A)-5

To the thus prepared (A)-4 in the above-described manner, as a polymerization catalyst, cesium fluoride was added in an amount of 5 mol % with respect to the amount of a repeating unit, —(O-Ph-O-Ph-CO-Ph)-, which is the main structural unit of the polyphenylene ether ether ketone oligomer. The resultant was melted and mixed in a 230° C. melting bath to prepare a compound (A)-5.

Example 1

In a kneader, 15% by mass of the (A)-1, which was obtained in accordance with Reference Example 1 and used as component (A), and 85% by mass of a thermosetting polyimide resin (B)-1 (PETI-330, manufactured by Ube Industries, Ltd.), which was used as component (B), were heated to 250° C. and kneaded for 30 minutes to obtain a uniform thermosetting resin composition. Then, the thus obtained uniform thermosetting resin composition was degassed in vacuum, poured into a 100 mm×100 mm mold adjusted to have a thickness of 1 mm, and then heated at 360° C. for 1 hour, thereby obtaining a composite cured product. The evaluation results thereof are summarized in Table 1.

Example 2

A composite cured product was obtained in the same manner as in Example 1, except that the amount of the (A)-1 and that of the (B)-1 were each changed to 50% by mass. The evaluation results of the properties are summarized in Table 1.

Example 3

A composite cured product was obtained in the same manner as in Example 1, except that the amount of the (A)-1 and that of the (B)-1 were changed to 85% by mass and 15% by mass, respectively. The evaluation results of the properties are summarized in Table 1.

Example 4

A composite cured product was obtained in the same manner as in Example 2, except that the (A)-2 prepared in accordance with Reference Example 1 was used in place of the (A)-1. The evaluation results of the composite cured product are summarized in Table 1.

Example 5

In a kneader, 50% by mass of the (A)-1, which was obtained in accordance with Reference Example 1 and used as component (A), and 50% by mass of an epoxy resin composition (B)-2 [a mixture of 100 parts by mass of a bisphenol A-type epoxy resin (jER (registered trademark) 828, manufactured by Mitsubishi Chemical Corporation), 15 parts by mass of dicyandiamide (DICY7T manufactured by Mitsubishi Chemical Corporation) and 2 parts by mass of 3-(3,4-dichlorophenyl)-1,1-dimethyl urea (DCMU99, manufactured by Hodogaya Chemical Co., Ltd.)] which was used as component (B), were heated to 100° C. and kneaded for 30 minutes to obtain a uniform thermosetting resin composition. Then, the thus obtained uniform thermosetting resin composition was degassed in vacuum, poured into a 100 mm×100 mm mold adjusted to have a thickness of 1 mm, and then heated at 130° C. for 1 hour, thereby obtaining a composite cured product. The evaluation results thereof are summarized in Table 1.

Example 6

In a kneader, 25% by mass of the (A)-1 and 25% by mass of the (B)-1 were heated to 250° C. and kneaded for 30 minutes to obtain a resin composition. After unidirectionally arranging 50% by mass of (C)-1 (carbon fiber, manufactured by Toray Industries, Inc.: T700S-24K) in a mold, the thus obtained resin composition was poured thereto and degassed in vacuum, thereby impregnating the fiber with the resin composition. Then, the resultant was heated at 360° C. for 1 hour to obtain a composite cured product. The evaluation results thereof are summarized in Table 1.

Example 7

A composite cured product was obtained in the same manner as in Example 6, except that (C)-2 (glass fiber, manufactured by Nitto Boseki Co., Ltd.: RS460A-782) was used in place of the (C)-1. The evaluation results of the composite cured product are summarized in Table 1.

Example 8

In a kneader, 50% by mass of the (A)-3, which was obtained in accordance with Reference Example 2 and used as component (A), and 50% by mass of a thermosetting polyimide resin (B)-1 (PETI-330, manufactured by Ube Industries, Ltd.), which was used as component (B), were heated to 250° C. and kneaded for 30 minutes to obtain a uniform thermosetting resin composition. Then, the thus obtained uniform thermosetting resin composition was degassed in vacuum, poured into a 100 mm×100 mm mold adjusted to have a thickness of 1 mm, and then heated at 360° C. for 1 hour, thereby obtaining a composite cured product. The evaluation results thereof are summarized in Table 2.

Example 9

A composite cured product was obtained in the same manner as in Example 8, except that the (A)-4 prepared in accordance with Reference Example 3 was used in place of the (A)-3. The evaluation results of the composite cured product are summarized in Table 2.

Example 10

A composite cured product was obtained in the same manner as in Example 8, except that the (A)-5 prepared in accordance with Reference Example 3 was used in place of the (A)-3. The evaluation results of the composite cured product are summarized in Table 2.

Example 11

A composite cured product was obtained in the same manner as in Example 5, except that (B)-3 [a mixture of 100 parts by mass of tetraglycidyl diaminodiphenyl methane (ELM434, manufactured by Sumitomo Chemical Co., Ltd.) and 31 parts by mass of 4,4'-diaminodiphenylsulfone ("SEIKACURE (registered trademark)"-S, manufactured by Wakayama Seika Kogyo Co., Ltd.)] was used in place of the (B)-2 and that the curing temperature was changed to 220° C. The evaluation results of the composite cured product are summarized in Table 2.

Example 12

In a kneader, 50% by mass the (A)-1, which was obtained in accordance with Reference Example 1 and used as component (A), and 50% by mass of a bismaleimide resin (B)-4 (bisphenol A diphenyl ether bismaleimide, manufactured by Daiwa Kasei Industry Co., Ltd.: BMI-4000), which was used as component (B), were heated to 170° C. and kneaded for 15 minutes to obtain a uniform thermosetting resin composition. Then, the thus obtained uniform thermosetting resin composition was degassed in vacuum, poured into a 100 mm×100 mm mold adjusted to have a thickness of 1 mm, and then heated at 220° C. for 1 hour, thereby obtaining a composite cured product. The evaluation results thereof are summarized in Table 2.

Example 13

In a kneader, 25% by mass of the (A)-1 and 25% by mass of the (B)-1 were heated to 250° C. and kneaded for 30 minutes to obtain a resin composition. After placing 50% by mass of (C)-3 (carbon fiber fabric, manufactured by Toray Industries, Inc.: CO6343 (plain weave, basis weight: 198 g/m$^2$)) in a mold, the thus obtained resin composition was poured thereto and degassed in vacuum, thereby impregnating the carbon fiber fabric with the resin composition. Then, the resultant was heated at 360° C. for 1 hour to obtain a composite cured product. The evaluation results thereof are summarized in Table 2.

Example 14

In a kneader, 25% by mass of the (A)-1 and 25% by mass of the (B)-3 were heated to 100° C. and kneaded for 30 minutes to obtain a resin composition. After unidirectionally arranging 50% by mass of the (C)-1 in a mold, the thus obtained resin composition was poured thereto and degassed in vacuum, thereby impregnating the fiber with the resin composition. Then, the resultant was heated at 220° C. for 1 hour to obtain a composite cured product. The evaluation results thereof are summarized in Table 2.

Example 15

In a kneader, 25% by mass of the (A)-3 and 25% by mass of the (B)-1 were heated to 250° C. and kneaded for 30 minutes to obtain a resin composition. After unidirectionally arranging 50% by mass of the (C)-1 in a mold, the thus obtained resin composition was poured thereto and degassed in vacuum, thereby impregnating the fiber with the resin composition. Then, the resultant was heated at 360° C. for 1 hour to obtain a composite cured product. The evaluation results thereof are summarized in Table 2.

Comparative Example 1

An experiment was conducted in the same manner as in Example 1, except that the (A)-1 was used in an amount of 100% by mass and the (B)-1 was not used. As a result, the resulting composite cured product could not be demolded at 360° C., so that a good molded article could not be obtained. The evaluation results are summarized in Table 3.

Comparative Example 2

A composite cured product was obtained in the same manner as in Example 5, except that 50% by mass of PPS-1 (polyphenylene sulfide resin, manufactured by Toray Industries, Inc.: "TORELINA" (registered trademark)) was used in place of the (A)-1. The evaluation results of the composite cured product are summarized in Table 3.

Comparative Example 3

An experiment was conducted in the same manner as in Example 1, except that PPS-1 (polyphenylene sulfide resin, manufactured by Toray Industries, Inc.: "TORELINA" (registered trademark)) was used in an amount of 100% by mass in place of the (A)-1 and the (B)-1 was not used. As a result, the resulting composite cured product could not be demolded at 360° C., so that a good molded article could not be obtained. The evaluation results are summarized in Table 3.

Comparative Example 4

An experiment was conducted in the same manner as in Example 6, except that the (A)-1 and the (C)-1 were each used in an amount of 50% by mass and the (B)-1 was not used. As a result, the resulting composite cured product could not be demolded at 360° C., so that a good molded article could not be obtained. The evaluation results are summarized in Table 3.

Comparative Example 5

An experiment was conducted in the same manner as in Example 6, except that 25% by mass of PPS-1 (polyphenylene sulfide resin, manufactured by Toray Industries, Inc.: "TORELINA" (registered trademark)) was used in place of the (A)-1. The evaluation results of the composite cured product are summarized in Table 3.

Comparative Example 6

An experiment was conducted in the same manner as in Example 1, except that PEEK-1 ("VICTREX" (registered trademark) PEEK™151G (polyether ether ketone resin manufactured by Victrex-MC Inc., melting point: 343° C.)) was used in an amount of 100% by mass in place of the (A)-1 and the (B)-1 was not used. As a result, the resulting composite cured product could not be demolded at 360° C., so that a good molded article could not be obtained. The evaluation results are summarized in Table 3.

Comparative Example 7

A composite cured product was obtained in the same manner as in Example 8, except that PEEK-1 ("VICTREX" (registered trademark) PEEK™151G (polyether ether ketone resin manufactured by Victrex-MC Inc., melting point: 343° C.)) was used in an amount of 50% by mass in place of the (A)-3. The evaluation results of the composite cured product are summarized in Table 3.

Comparative Example 8

A composite cured product was obtained in the same manner as in Example 15, except that PEEK-1 ("VICTREX" (registered trademark) PEEK™151G (polyether ether ketone resin manufactured by Victrex-MC Inc., melting point: 343° C.)) was used in an amount of 25% by mass in place of the (A)-3. The evaluation results of the composite cured product are summarized in Table 3.

TABLE 1

|  |  |  | Example 1 | Example 2 | Example 3 | Example 4 | Example 5 | Example 6 | Example 7 |
|---|---|---|---|---|---|---|---|---|---|
| Component (A) or | (A)-1 |  | 15 | 50 | 85 |  | 50 | 25 | 25 |
| Mixture of component | (A)-2 |  |  |  |  | 50 |  |  |  |
| (A) and catalyst | (A)-3 |  |  |  |  |  |  |  |  |
|  | (A)-4 |  |  |  |  |  |  |  |  |
|  | (A)-5 |  |  |  |  |  |  |  |  |
| Component (B) | (B)-1 |  | 85 | 50 | 15 | 50 |  | 25 | 25 |
|  | (B)-2 |  |  |  |  |  | 50 |  |  |
|  | (B)-3 |  |  |  |  |  |  |  |  |
|  | (B)-4 |  |  |  |  |  |  |  |  |
| Reinforcement fiber | (C)-1 |  |  |  |  |  |  | 50 |  |
| (C) | (C)-2 |  |  |  |  |  |  |  | 50 |
|  | (C)-3 |  |  |  |  |  |  |  |  |
| Other component | PPS-1 |  |  |  |  |  |  |  |  |
|  | PEEK-1 |  |  |  |  |  |  |  |  |
| Molded article | Temperature T | ° C. | 360 | 360 | 360 | 360 | 130 | 360 | 360 |
|  | Demoldability at temperature T | — | demoldable | demoldable | demoldable | demoldable | demoldable | demoldable | demoldable |
|  | Porosity(Note) | % | A | A | A | A | A | A | A |

(Note)A: 0% to less than 5%, B: 5% or more to less than 20%, C: 20% or more to less than 40%, D: 40% or more

TABLE 2

|  |  | Example 8 | Example 9 | Example 10 | Example 11 | Example 12 | Example 13 | Example 14 | Example 15 |
|---|---|---|---|---|---|---|---|---|---|
| Component (A) or | (A)-1 |  |  |  | 50 | 50 | 25 | 25 |  |
| Mixture of | (A)-2 |  |  |  |  |  |  |  |  |
| component (A) | (A)-3 | 50 |  |  |  |  |  |  | 25 |
| catalyst | (A)-4 |  | 50 |  |  |  |  |  |  |
|  | (A)-5 |  |  | 50 |  |  |  |  |  |
| Component (B) | (B)-1 | 50 | 50 | 50 |  |  | 25 |  | 25 |
|  | (B)-2 |  |  |  |  |  |  |  |  |
|  | (B)-3 |  |  |  | 50 |  |  | 25 |  |
|  | (B)-4 |  |  |  |  | 50 |  |  |  |
| Reinforcement | (C)-1 |  |  |  |  |  |  | 50 | 50 |
| fiber (C) | (C)-2 |  |  |  |  |  |  |  |  |
|  | (C)-3 |  |  |  |  |  | 50 |  |  |
| Other component | PPS-1 |  |  |  |  |  |  |  |  |
|  | PEEK-1 |  |  |  |  |  |  |  |  |

TABLE 2-continued

|  |  |  | Example 8 | Example 9 | Example 10 | Example 11 | Example 12 | Example 13 | Example 14 | Example 15 |
|---|---|---|---|---|---|---|---|---|---|---|
| Molded article | Temperature T | °C. | 360 | 360 | 360 | 220 | 220 | 360 | 220 | 360 |
|  | Demoldability at temperature T | — | demoldable | demoldable | demoldable | demoldable | demoldable | demoldable | demoldable | demoldable |
|  | Porosity(Note) | % | A | A | A | A | A | A | A | A |

(Note)A: 0% to less than 5%, B: 5% or more to less than 20%, C: 20% or more to less than 40%, B: 40% or more

TABLE 3

|  |  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Component (A) or Mixture of component (A) and catalyst | (A)-1 |  | 100 |  |  | 50 |  |  |  |  |
|  | (A)-2 |  |  |  |  |  |  |  |  |  |
|  | (A)-3 |  |  |  |  |  |  |  |  |  |
|  | (A)-4 |  |  |  |  |  |  |  |  |  |
|  | (A)-5 |  |  |  |  |  |  |  |  |  |
| Component (B) | (B)-1 |  |  |  |  |  | 25 |  | 50 | 25 |
|  | (B)-2 |  |  | 50 |  |  |  |  |  |  |
|  | (B)-3 |  |  |  |  |  |  |  |  |  |
|  | (B)-4 |  |  |  |  |  |  |  |  |  |
| Reinforcement fiber (C) | (C)-1 |  |  |  |  | 50 | 50 |  |  | 50 |
|  | (C)-2 |  |  |  |  |  |  |  |  |  |
|  | (C)-3 |  |  |  |  |  |  |  |  |  |
| Other component | PPS-1 |  |  | 50 | 100 |  | 25 |  |  |  |
|  | PEEK-1 |  |  |  |  |  |  | 100 | 50 | 25 |
| Molded article | Temperature T | °C. | 360 | 130 | 360 | 360 | 360 | 360 | 360 | 360 |
|  | Demoldability at temperature T | — | not demoldable | demoldable | not demoldable | not demoldable | demoldable | not demoldable | demoldable | demoldable |
|  | Porosity(Note) | % | — | D | — | — | D | D | D | D |

(Note)A: 0% to less than 5%, B: 5% or more to less than 20%, C: 20% or more to less than 40%, D: 40% or more, —: not demoldable and As seen from the above, in Examples 1 to 15, a composite cured product having good moldability and a limited amount of voids was obtained by using the resin composition.

In contrast, in Comparative Examples 1 to 8, since the resin compositions that were difficult to demold at their respective curing temperatures or even those demoldable thermosetting resins contained a large amount of voids, a good molding material could not be obtained.

INDUSTRIAL APPLICABILITY

The resin composition has excellent moldability and impregnation properties by containing a cyclic compound. The resin composition is capable of yielding a composite cured product which has a limited amount of voids and exhibits excellent toughness, flame retardancy and the like. Therefore, the composite cured product can be used in a variety of applications and, in particular, it is suitably used in automobile applications, airplane applications, electrical and electronic components, and parts of household and office electric appliances.

The invention claimed is:
1. A resin composition comprising:
   10 to 90% by mass of (A) a component to be polymerized containing a compound represented by Formula (1);
   90 to 10% by mass of (B) a thermosetting resin, wherein a total amount of the components (A) and (B) is 100% by mass, and the compound represented by the Formula (1) is a cyclic compound containing, as a main structural unit, the p-phenylene sulfide unit represented by Formula (11) in an amount not less than 80 mol %, said (A) and (B) each being capable of undergoing a reaction to increase molecular weight by itself when heated:

wherein, Ar represents Formula (2); X represents sulfides and m is 2 to 50, and a zero-valent transition metal compound of 0.001 to 20 mol % with respect to an amount of X in the component (A)

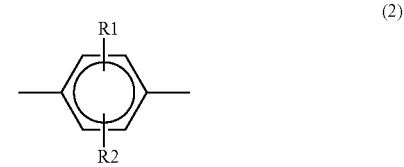

wherein, R1 and R2 each represent a substituent selected from a hydrogen, an alkyl group having 1 to 12 carbon atoms, an alkoxy group having 1 to 12 carbon atoms and a halogen group; R1 and R2 may be the same or different;

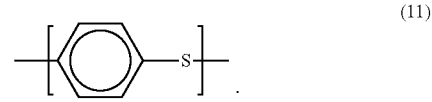

2. The resin composition according to claim 1, wherein said compound represented by Formula (1) is one selected from the group consisting of a cyclic polyphenylene sulfide, a cyclic polyphenylene ether ether ketone, a cyclic polyphenylene ether ketone and a cyclic polyphenylene ether sulfone.

3. The resin composition according to claim 1, wherein said (B) is one selected from the group consisting of an epoxy resin, a bismaleimide resin and a polyimide resin.

4. The resin composition according to claim 1, wherein said zero-valent transition metal compound comprises a metal belonging to Groups 8 to 11 and Periods 4 to 6 of the periodic table.

5. The resin composition according to claim 1, further comprising an alkali metal salt.

6. The resin composition according to claim 1, further comprising (C) a reinforcement fiber.

7. The resin composition according to claim 6, wherein said (C) reinforcement fiber is a carbon fiber.

8. A method of producing a composite cured product comprising allowing the resin composition according to claim 1 to react by heating to obtain a composite cured product.

9. A method of producing a composite cured product comprising impregnating the resin composition according to claim 1 into a reinforcement fiber and then allowing said resin composition to react by heating to obtain a composite cured product.

10. A composite cured product comprising:
10 to 90% by mass of (A) a component to be polymerized containing a compound represented by Formula (1) and/or (A') a polymer obtained by polymerization of said (A) component to be polymerized alone;
90 to 10% by mass of (B') a cured product obtained by a reaction of (B) a thermosetting resin, wherein a total amount of the components (A) and/or (A') and (B) is 100% by mass, and the compound represented by Formula (1) is a cyclic compound containing, as a main structural unit, the p-phenylene sulfide unit represented by Formula (11) in an amount of not less than 80 mol %:

wherein, Ar represents Formula (2); sulfides and m is 2 to 50, and a zero-valent transition metal compound of 0.001 to 20 mol % with respect to an amount of X in the component (A)

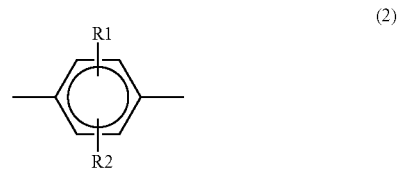

wherein, R1 and R2 each represent a substituent selected from a hydrogen, an alkyl group having 1 to 12 carbon atoms, an alkoxy group having 1 to 12 carbon atoms and a halogen group; R1 and R2 may be the same or different;

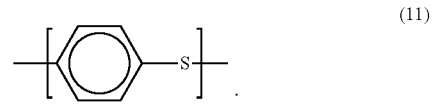

11. The composite cured product according to claim 10, further comprising (C) a reinforcement fiber.

12. The resin composition according to claim 2, wherein said (B) is one selected from the group consisting of an epoxy resin, a bismaleimide resin and a polyimide resin.

13. The resin composition according to claim 2, further comprising an alkali metal salt.

14. The resin composition according to claim 3, further comprising an alkali metal salt.

* * * * *